(12) United States Patent
Valient et al.

(10) Patent No.: US 11,120,591 B2
(45) Date of Patent: Sep. 14, 2021

(54) VARIABLE RASTERIZATION RATE

(71) Applicant: Apple Inc., Cupertino, CA (US)

(72) Inventors: Michal Valient, San Jose, CA (US); Michael Imbrogno, San Jose, CA (US); Rohan Sehgal, Mountain View, CA (US); Kyle C. Piddington, Westlake Village, CA (US); Matthijs L. van der Meide, London (GB)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/428,374

(22) Filed: May 31, 2019

(65) Prior Publication Data

US 2020/0380744 A1 Dec. 3, 2020

(51) Int. Cl.
*G06T 11/40* (2006.01)
*G06T 1/20* (2006.01)

(52) U.S. Cl.
CPC .............. *G06T 11/40* (2013.01); *G06T 1/20* (2013.01)

(58) Field of Classification Search
None
See application file for complete search history.

(56) References Cited

U.S. PATENT DOCUMENTS

| | | | |
|---|---|---|---|
| 6,489,956 B1* | 12/2002 | Deering | G06T 5/20 345/419 |
| 2006/0056082 A1* | 3/2006 | Hung | H04N 5/217 359/819 |
| 2017/0323475 A1* | 11/2017 | Moreton | G06T 15/80 |
| 2018/0075635 A1* | 3/2018 | Choi | H04N 5/23238 |
| 2018/0240268 A1* | 8/2018 | Nevraev | G06T 15/005 |
| 2018/0276790 A1* | 9/2018 | Mantor | G06T 3/0093 |

* cited by examiner

*Primary Examiner* — Sultana M Zalalee
(74) *Attorney, Agent, or Firm* — Blank Rome LLP

(57) ABSTRACT

One disclosed embodiment includes a method of graphics processing. The method includes receiving a first function, wherein the first function indicates a desired sampling rate for image content, wherein the desired sampling rate differs in a first location along a first axial direction and a second location along the first axial direction, and wherein the image content is divided into a plurality of tiles, determining a first rasterization rate for each tile of the plurality of tiles based, at least in part, on the desired sampling rate indicated by the first function corresponding to each respective tile, receiving one or more primitives associated with content for display, rasterizing at least a portion of a primitive associated with a respective tile based, at least in part, on the determined first rasterization rate for the respective tile, and displaying an image based on the rasterized portion of the primitive.

17 Claims, 11 Drawing Sheets

| 370 APPLICATION A | 371 PHOTOS | 372 FINANCIAL MANAGEMENT APPLICATION | 373 MOVIE APPLICATION | 374 APPLICATION B | 375 |
|---|---|---|---|---|---|
| 360 OTHER APPLICATION SERVICES | 361 GAME ENGINE | 362 3D RENDERING ENGINE | 363 ANIMATION ENGINE | 364 RENDERING ENGINE | 380 |
| 350 O/S SERVICES | 351 OPENGL | 352 METAL | 353 SOFTWARE RAYTRACER | 354 SOFTWARE RASTERIZER | 385 |
| O/S KERNEL 345 | | | | | 390 |
| HARDWARE 340 | | | | | 395 |

*FIG. 3*

VARIABLE RASTERIZATION RATE

BACKGROUND

The disclosed subject matter relates to the field of graphic processing. More specifically, but not by way of limitation, the disclosed subject matter relates to the use of variable rasterization rates when displaying computer graphics.

Computers and other computational devices typically have at least one programmable processing element that is generally known as a central processing unit (CPU). They frequently also have other programmable processors that are used for specialized processing of various types, such as graphic processing operations, which may be performed by graphic processing units (GPUs). GPUs generally comprise multiple cores or processing elements designed for executing the same instruction on parallel data streams, making GPUs more effective than general-purpose CPUs for algorithms in which processing of large blocks of data is done in parallel. In general, a CPU functions as the host and hands-off specialized parallel tasks to the GPUs.

In order for a frame to be rendered on a display, the GPU and the CPU typically work together. The number of frames displayed per second (FPS) is referred to as a frame rate. At lower frame rates, the human eyes can distinguish still frames displayed in rapid succession. However, at higher frame rates, individual frames are not perceptible to a human and instead appear as seamless motion. Therefore, everything else being equal (e.g. resolution), a display with a higher frame rate provides a higher graphic quality.

Generally, as computer displays improve, the resolution of these computer displays also increase. A display's resolution refers to the number of pixels contained in the display in the vertical and horizontal axis. To take advantage of higher resolution displays, the GPU and CPU must provide frames at the higher resolution. Additionally, to display three-dimensional (3-D) graphics or virtual reality (VR) graphics, two separate frames, e.g., one for the right eye and one for the left, may be rendered for display, rather than a single image. This higher resolution and number of frames generally require increased CPU and GPU efficiency for rendering frames. Otherwise, the image may be perceived by a human user as a lower quality image due to, for example, skipped frames, miss-matched right/left images, lower spatial resolution, loss of 3-D effect, etc.

SUMMARY

One disclosed embodiment includes a method of graphics processing. The method includes receiving a first function, wherein the first function indicates a desired sampling rate for image content, wherein the desired sampling rate differs in a first location along a first axial direction and a second location along the first axial direction, and wherein the image content is divided into a plurality of tiles. The method also includes determining a first rasterization rate for each tile of the plurality of tiles based on the desired sampling rate indicated by the first function corresponding to each respective tile. The rasterization rate, as discussed in detail below, is a rate at which an object is object space is sampled for projection to a viewpoint. The method further includes receiving one or more primitives associated with content for display. The method also includes rasterizing at least a portion of a primitive associated with a respective tile based on the determined first rasterization rate for the respective tile. The method further includes displaying an image based on the rasterized portion of the primitive.

Another aspect of the present disclosure relates to a non-transitory program storage device comprising instructions stored thereon to cause one or more graphics processors to receive a first function, wherein the first function indicates a desired sampling rate for image content, wherein the desired sampling rate differs in a first location along a first axial direction and a second location along the first axial direction, and wherein the image content is divided into a plurality of tiles, determine a first rasterization rate for each tile of the plurality of tiles based on the desired sampling rate indicated by the first function corresponding to each respective tile, receive one or more primitives associated with content for display, rasterize at least a portion of a primitive associated with a respective tile based on the determined first rasterization rate for the respective tile, and display an image based on the rasterized portion of the primitive.

Another aspect of the present disclosure relates to an electronic device including a memory, a display, a user interface, and one or more graphic processors operatively coupled to the memory, wherein the one or more graphic processors are configured to execute instructions causing the one or more graphic processors to receive a first function, wherein the first function indicates a desired sampling rate for image content, wherein the desired sampling rate differs in a first location along a first axial direction and a second location along the first axial direction, and wherein the image content is divided into a plurality of tiles, determine a first rasterization rate for each tile of the plurality of tiles based on the desired sampling rate indicated by the first function corresponding to each respective tile, receive one or more primitives associated with content for display, rasterize at least a portion of a primitive associated with a respective tile based on the determined first rasterization rate for the respective tile, and display an image based on the rasterized portion of the primitive.

In one embodiment, each of the above described methods, and variation thereof, may be implemented as a series of computer executable instructions. Such instructions may use any one or more convenient programming language. Such instructions may be collected into engines and/or programs and stored in any media that is readable and executable by a computer system or other programmable control device.

BRIEF DESCRIPTION OF THE DRAWINGS

FIG. 3 is a block diagram showing an illustrative software architecture diagram according to one or more embodiments of the disclosed subject matter according to an embodiment of the disclosure.

DETAILED DESCRIPTION

In the following description, for purposes of explanation, numerous specific details are set forth in order to provide a thorough understanding of the invention. It will be apparent, however, to one skilled in the art that the disclosed examples may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment, and multiple references to "one embodiment" or "an embodiment" should not be understood as necessarily all referring to the same embodiment.

As used herein, the term "a computer system" refers to a single computer system or a plurality of computer systems working together to perform the function described as being performed on or by a computer system. Similarly, a machine-readable medium can refer to a single physical medium or to a plurality of media that may together contain the indicated information stored thereon. Reference to a processor refers to a single processing element or to a plurality of processing elements, implemented either on a single chip or on multiple processing chips.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design an implementation of systems having the benefit of this disclosure and being of ordinary skill in the design and implementation of computing systems and/or graphic systems.

Figure 1:
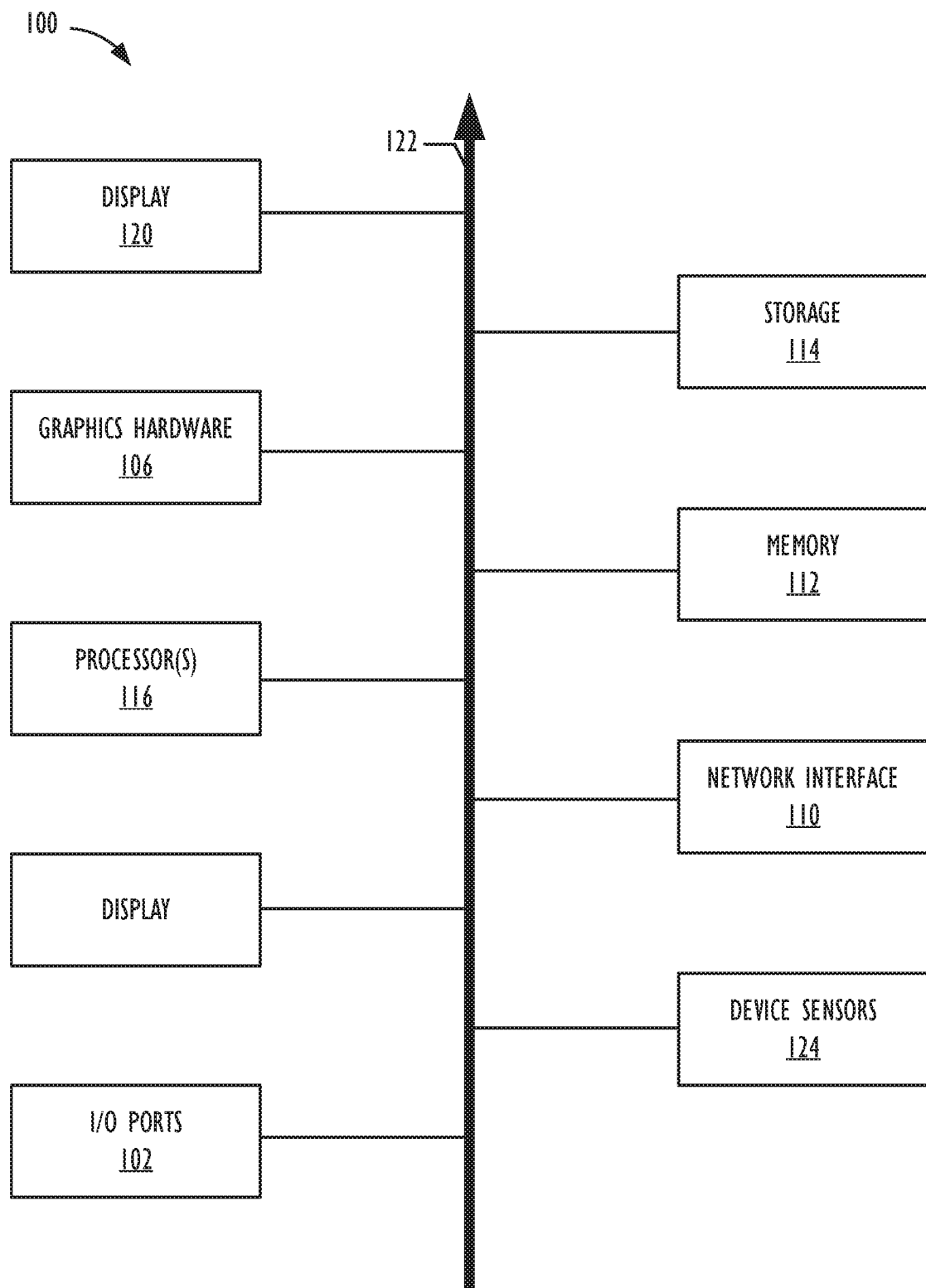
FIG. 1 is a block diagram illustrating a computer system that may be used, for example, as an end-user or developer computer system according to an embodiment of the disclosure.

Referring to FIG. 1, the disclosed embodiments may be performed by representative computer system 100. For example, the representative computer system 100 may act as a software development platform or an end-user device. While FIG. 1 illustrates various components of a computer system, it is not intended to represent any particular architecture or manner of interconnecting the components as such details are not germane to the present disclosure. Network computers and other data processing systems (for example, handheld computers, personal digital assistants (PDAs), cellular telephones, entertainment systems and other consumer electronic devices, etc.) which have fewer components or perhaps more components may also be used to implement one or more embodiments.

As illustrated in FIG. 1, computer system 100 includes bus 122 which is coupled to one or more processor(s) 116, which may be CPUs and/or digital signal processors (DSPs), memory 112, which may include one or both of a volatile read/write random access memory (RAM) and a read-only memory (ROM), and a non-volatile storage device 114 (e.g., a solid state storage drive). Processor(s) 116 may retrieve instructions from the memory 112 and/or storage device 114 and execute the instructions to perform operations described herein. Bus 122 interconnects these various components together and also interconnects processor 116, memory 112, and storage device 114 to display 120, I/O ports 102 and peripheral devices such as input/output (I/O) devices 104. I/O devices 104 may be pointing devices such as a mouse or stylus, keyboards, touch screens (e.g., display 120 and I/O devices 104 may be implemented as a single touch-sensitive display), modems, network interfaces, printers and other devices. Typically, Input/output devices 104 are coupled to the system through an input/output controller(s).

Computer system 100 may also include or be coupled to device sensors 124. Devices sensors 124 may include one or more of: depth sensors (such as a depth camera), three-dimensional (3D) depth sensor(s), imaging devices (such as a fixed and/or video-capable image capture unit), red-green-blue (RGB) sensors, proximity sensors, ambient light sensors, accelerometers, gyroscopes, any type of still or video camera, light detection and ranging (LIDAR) devices, Global Positioning Systems (GPS), microphones, charge coupled devices (CCDs) (or other image sensors), infrared sensors, thermometers, etc. These and other sensors may work in combination with one or more GPUs, digital signal processors (DSPs), or conventional microprocessors along with appropriate programming so that the sensor outputs may be properly interpreted and/or combined and interpreted.

Where volatile RAM is included in memory 112, the RAM may be implemented as dynamic RAM (DRAM), which requires continuous power in order to refresh or maintain the data in the memory. Graphic hardware 106 may be special purpose computational hardware for processing graphic and/or assisting processor(s) 116 in performing computational tasks. In some embodiments, graphic hardware 106 may include CPU-integrated graphic and/or one or more programmable GPUs.

Storage device 114 may be a magnetic hard drive, an optical drive, a non-volatile solid-state storage drive, or other types of storage systems, which maintain data (e.g. large amounts of data) even after power is removed from the system (i.e., non-volatile). While FIG. 1 shows that storage device 114 is a local device coupled directly to the rest of the components in the computer system 100, embodiments may utilize a non-volatile storage device which is remote from computer system 100, such as a network storage device which is coupled to the computer system 100 through network interface 110. Network interface may be a wired or wireless networking interface. Bus 122 may include one or more links connected to each other through various bridges, controllers, and/or adapters as is well known in the art. Although only a single element of each type is illustrated in FIG. 1 for clarity, multiple elements of any or all of the various element types may be used as desired.

Figure 2:
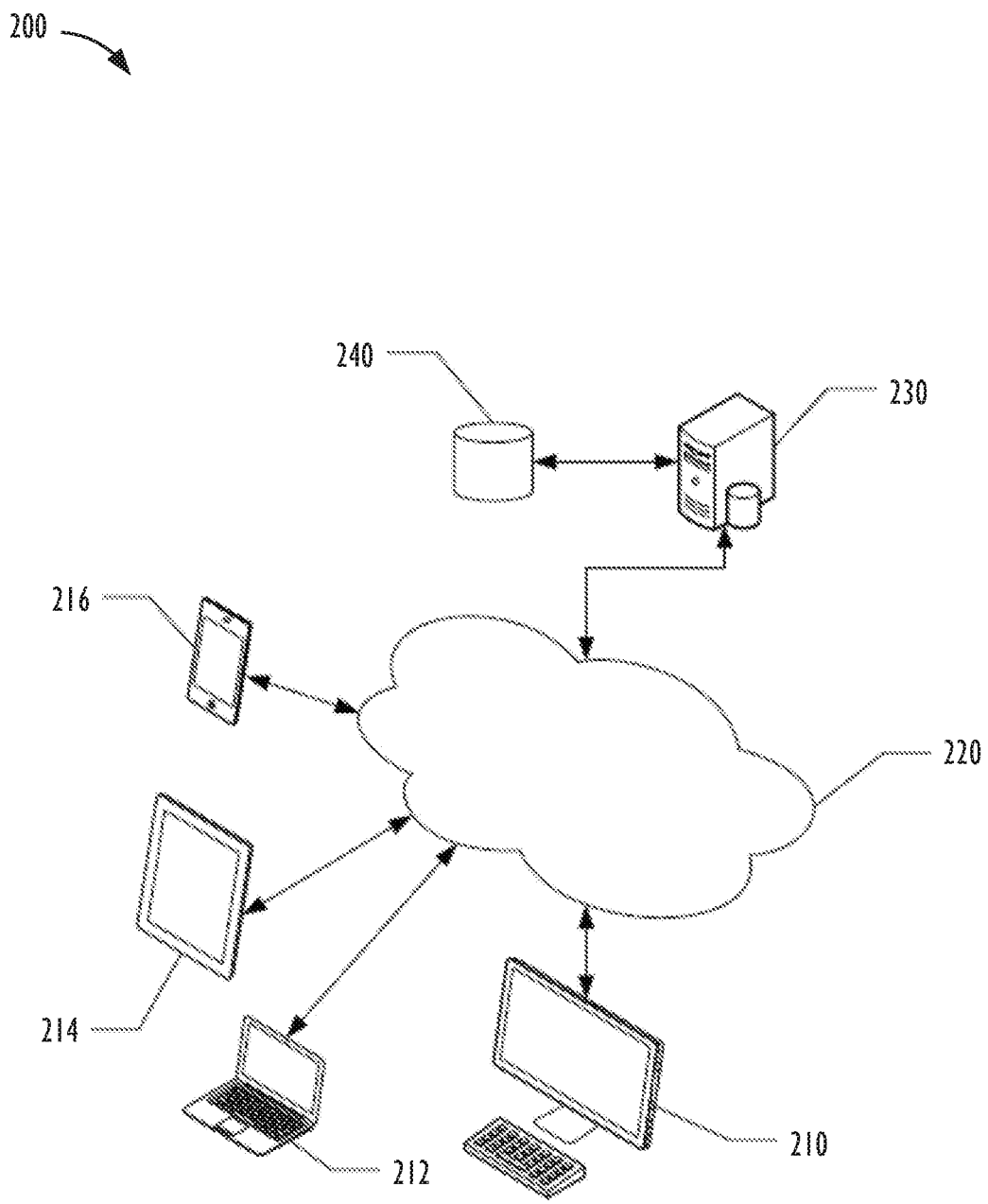
FIG. 2 is a block diagram illustrating a network environment that may be associated with one or more embodiments of the disclosed subject matter according to an embodiment of the disclosure.

Turning now to FIG. 2, a block diagram illustrates a network 200 of interconnected programmable devices, including server 230 and an associated datastore 240, as well as desktop computer system 210, notebook computer system 212, tablet computer system 214, and mobile phone 216. Other types of computer devices may be included as well. Any of these programmable devices may be the developer system or the target system shown as computing system 100 of FIG. 1. Network 220 interconnects the programmable devices and may be any type of network, wired or wireless, local or wide area, public or private, using any desired network communication protocols for transport of data from one system to the other. Although illustrated as a single network 220, any number of interconnected networks may be used to connect the various programmable devices, and each may employ a different network technology.

In one example, desktop system 210 may be a developer system, distributing a graphics application to server 230, which in turn may distribute the graphics application to multiple devices such as systems 212, 214, and 216, each of which may employ a separate GPU. Upon launch of the graphics application, one action performed by the application can be creation of a collection of pipeline objects that may include state information, fragment shaders, and vertex shaders.

As noted above, embodiments of the subject matter disclosed herein include the use and execution of software. As such, an illustrative description of a computing software architecture is provided in a layer diagram in FIG. 3. Like the hardware examples, the software architecture in the example of FIG. 3 discussed herein is not intended to be exclusive in any way, but rather to be illustrative. This is especially true for layer-type diagrams which software developers tend to express in somewhat differing ways. In this case, the description begins with layers starting with the base hardware layer 395 illustrating hardware 340, which may include CPUs and GPUs or other processing and/or computer hardware as described above. Above the hardware layer is the operating system (O/S) kernel layer 390 showing an example as O/S kernel 345, which is kernel software that may perform memory management, device management, and system calls (often the purview of hardware drivers). The notation employed here is generally intended to imply that software elements shown in a layer use resources from the layers below and provide services to layers above. However, all components of a particular software element may not behave entirely in that manner.

Returning to FIG. 3, layer 385 is the O/S services layer, exemplified by O/S services 350. O/S services 350 may provide core O/S functions in a protected environment. In addition, O/S services 350 shown in layer 385 may include frameworks for OpenGL® 351, Metal® 352, Software Raytracer 353, and a Pure Software Rasterizer 354 (OpenGL is a registered trademark of Silicon Graphic, Inc., and Metal is a registered trademark of Apple, Inc.). These particular examples all relate to graphics and/or graphics libraries, all of which relate to graphics handling. These particular examples also represent graphics frameworks/libraries that may operate in the lower tier of frameworks, such that developers may use shading and graphic primitives and/or obtain fairly tightly coupled control over the graphic hardware. In addition, the particular examples named in layer 385 may pass their work product directly to hardware or hardware drivers, which may be software that is tightly coupled to the hardware.

Referring still to FIG. 3, OpenGL® 351 represents an example of a well-known library and application programming interface (API) for graphics rendering including two-dimensional (2D) and 3D graphics. Metal® 352 also represents a published graphic library and framework, but it is lower level than OpenGL® 351, supporting fine-grained, low-level control of the organization, processing, and submission of graphic and computational commands, as well as the management of associated data and resources for those commands. Software Raytracer 353 is software for creating image information based upon the process of tracing the path of light through pixels in the plane of an image. Pure Software Rasterizer 354 refers generally to software used to make graphics information such as pixels without specialized graphic hardware (e.g., using only the CPU). These libraries or frameworks shown within the O/S services layer 385 are only illustrative and are intended to show the general level of the layer and how it relates to other software in a sample arrangement (e.g., lower level kernel operations and higher-level applications services 360). In addition, Metal® 352 represents a published framework/library of Apple Inc. usable by developers of graphics applications.

Above the O/S services layer 385 is an application services layer 380, which includes a game engine 361, a 3D rendering engine 362, an animation engine 363, and a rendering engine 364. The O/S services layer 385 represents higher-level frameworks that are directly accessed by application programs. In some embodiments the O/S services layer 385 includes graphic-related frameworks that are high level in that they are agnostic to the underlying graphic libraries (such as those discussed with respect to layer 385). In such embodiments, these higher-level graphic frameworks are meant to provide developers access to graphics functionality in a more user- and developer-friendly way and to allow developers to avoid work with shading and graphic primitives. By way of example, the game engine 361 may be a graphics rendering and animation infrastructure and may be used to animate two-dimensional (2D) textured images. The 3D rendering engine 362 may be a 3D-rendering framework that helps the import, manipulation, and rendering of 3D assets at a higher level than frameworks having similar capabilities, such as OpenGL®. Animation engine 363 may be a graphic rendering and animation infrastructure and may be used to animate views and other visual elements of an application. Rendering engine 364 may be a two-dimensional drawing engine for providing 2D rendering for applications.

Application layer 375 resides above the application services layer 380. Application layer 375 comprises any number and type of application programs. By way of example, FIG. 3 shows three specific applications: photos 371 (a photo management, editing, and sharing program), financial management application 372, and movie application 373 (a movie making and sharing program). Application layer 375 also shows two generic applications A 370 and B 374, which represent any other applications that may interact with or be part of the disclosed embodiments. Generally, embodiments of the disclosed subject matter employ and/or interact with applications that produce displayable/viewable content.

In evaluating O/S services layer 385 and applications services layer 380, it may be useful to realize that different frameworks have higher- or lower-level application program interfaces, even if the frameworks are represented in the same layer of the FIG. 3 diagram. The illustration of FIG. 3 serves to provide a general guideline and to introduce illustrative frameworks that may be discussed herein. Furthermore, in some examples, the frameworks in layer 380 make use of the libraries represented in layer 385. Thus, FIG. 3 provides intellectual reinforcement for these examples. FIG. 3 is not intended to limit the types of frameworks or libraries that may be used in any particular way or in any particular embodiment. Generally, many embodiments of this disclosure propose software activity and architecture in the layers between the hardware 340 and application 375 layers.

With reference again to FIG. 3, some embodiments include the use of higher-level frameworks, such as those shown in application services layer 380. The high-level frameworks may perform intelligent analysis on particular graphics requests from application programs. The high-level framework may then choose a specific hardware and/or a specific library or low-level framework to help process the request. In these embodiments, the intelligent analysis may provide for on-the-fly decision making regarding the best path for the graphic request to follow down to hardware.

Figure 4:
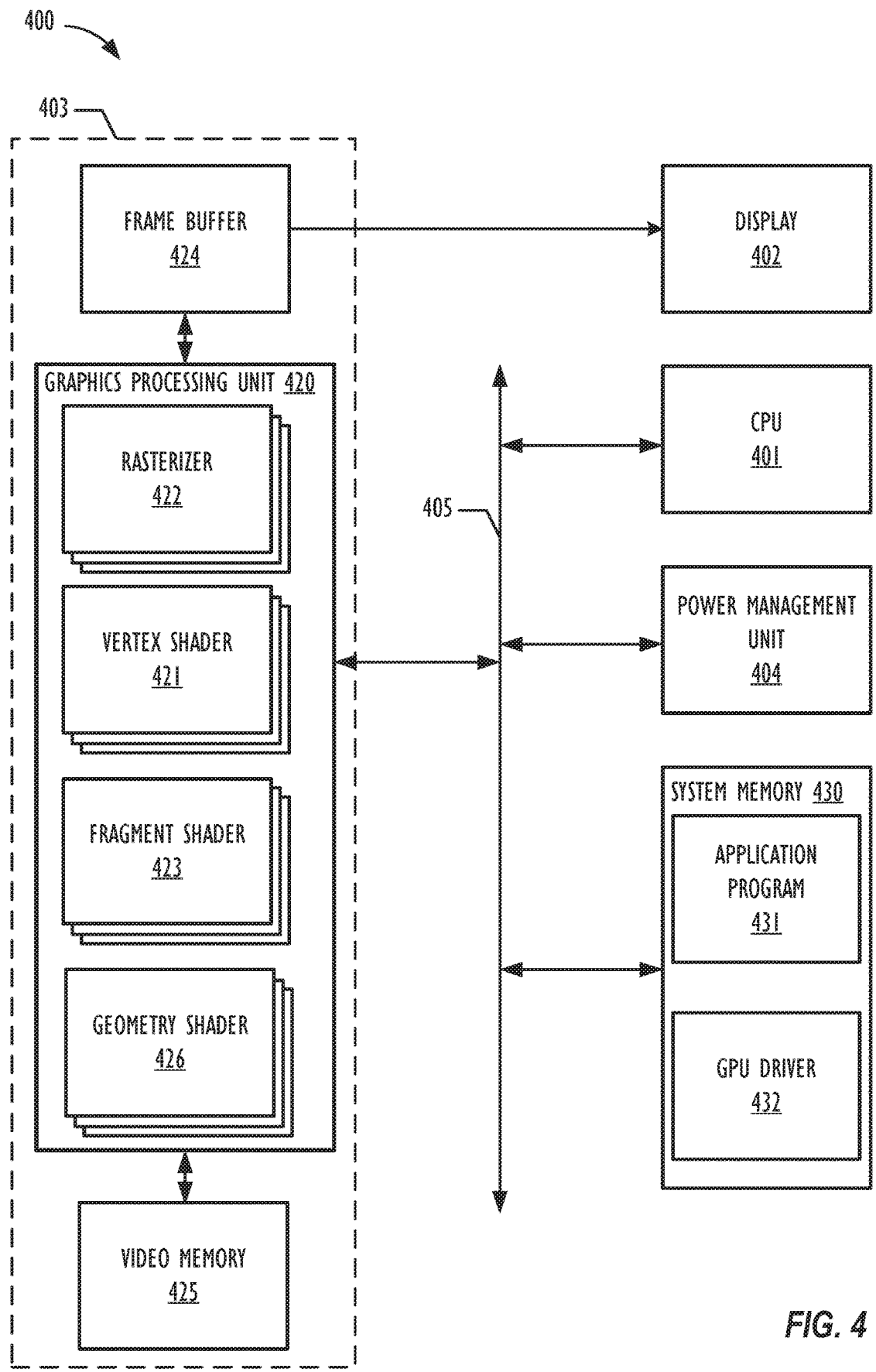
FIG. 4 is block diagram illustrating a computer system for implementing one or more aspects of the disclosed subject matter according to an embodiment of the disclosure.

Referring now to FIG. 4, a block diagram of computing system 400 illustrates a computer system according to an embodiment in additional detail. Computing system 400 includes a CPU 401, a graphic processing system 403, a display 402, a power management unit (PMU) 404, and system memory 430. In one embodiment, CPU 401 and graphics processing system 403 are included on separate integrated circuits (ICs) or IC packages. In other embodiments, however, CPU 401 and graphics processing system 403, or the collective functionality thereof, may be included in a single IC or package.

The representative graphics processing system 403 may act to process application data and render graphical representations of virtual objects to a display 402. For example, a CPU 401 may receive a request from application code (not shown) to render a graphic. The request may be via an internal or third-party graphics library and framework. The graphic may be a portion of a model of a virtual object comprising one or more polygons, such as a triangle. This request may reference data stored, for example, in system memory 430 or video memory 425.

Data bus 405 connects different elements of the computing system 400 including CPU 401, system memory 430, and graphic processing system 403. In an embodiment, system memory 430 includes instructions that cause the CPU 401 and/or graphics processing system 403 to perform the functions ascribed to them in this disclosure. More specifically, graphics processing system 403 can receive instructions transmitted by CPU 401 and processes the instructions to render and display graphic images on display 402.

System memory 430 may include application program 431 and GPU driver 432. The graphics processing system 403 in this example include a frame buffer 424, a GPU 420 and video memory 425. The GPU 420 may include a graphical pipeline including one or more vertex shaders 421, one or more rasterizers 422, one or more fragment shaders 423, and one or more geometry shaders 426. In some embodiments, a unified memory model may be supported where system memory 430 and video memory 425 comprise a single memory utilized by both the GPU 420 and CPU 401 rather than discrete memory systems. As used herein, application code may refer to code executing on CPU 401 during application run time, separate from graphical functions, which may execute on GPU 420. Graphical functions may execute on the GPU, for example, as hardware components of GPU 420, such as shaders, may be programmable, allowing for graphical functions to execute on GPU 420. Application programming interface (API) and Driver software, executing on CPU 401 may facilitate interactions between application code and graphical functions, such as by providing an interface between application code and GPU 420 and allowing the application code to set up and execute graphical functions on GPU 420.

In certain cases, the frame buffer 424 may be located in system memory 430. In some embodiments, the frame buffer 424 may be located in video memory 425 or as a dedicated memory. In an embodiment, application program 431 includes code written using the API. The API includes a predetermined, standardized set of commands that are executed by associated hardware. Application program 431 generates API commands to render an image by one or more shading engines and/or rasterizer of GPU 420 for display. GPU driver 432 translates the high-level API commands into machine code programs that are executable by the GPU 420.

In one embodiment, CPU 401 transmits API commands to GPU 420 to render graphic data and store rendered images in frame buffer 424 to be displayed on display 402. An image may be rendered by dividing the image into multiple sections of a grid where each section is known as a tile. Each tile may be rendered separately to video memory 425 by GPU 420. Rendering a single tile, rather than an entire frame at once, helps reduce the amount of memory and bandwidth needed for rendering. In certain cases, multiple times may be rendered independently, for example in parallel graphic pipelines. Upon completion of all tiles of a frame, frame buffer 424 may output the image to display 402. Common tile sizes include 16×16 pixels and 32×32 pixels, although arbitrarily sized tiles could also be used.

GPU 420 can include a plurality of multiprocessors that are configured to execute multiple threads in parallel. In certain cases, the multiprocessors may be configured as shaders and rasterizers. Generally, the GPU 420 may render a view of a virtual object using the virtual object's model coordinate system. The virtual object may be rendered from the point of view of a camera at a specified location. The vertex shaders 421 perform matrix operations on the coordinates of a particular polygon to determine coordinates at which to render the polygon from the point of view of the camera based on the model coordinates. Unlike vertex shader 421 that operates on a single vertex, the inputs received by geometry shader 426 are the vertices for a full primitive, e.g. two vertices for lines, three vertices for triangles, or single vertex for point. The rasterizer 422 then determines which pixels of the display are intersected by the polygon. The fragment shader 423 then assigns a color value to each of the pixels intersected by the polygon. This color value may be based, for example, on contents of a particular texture read from memory. This texture may be stored in memory 430 or video memory 425. Shaders may be programmable as a part of a programmable GPU pipeline using shader functions to allow for increased flexibility and functionality of the shaders. This programmability also allows the GPU to perform non-graphical, data-parallel tasks. In certain embodiments, the rasterizer 422 may be a fixed function of the GPU pipeline to allow for increased performance. Functionality of the rasterizer 422 may be adjusted via arguments or commands passed into the rasterizer 422, for example by the API or GPU driver 432. After the polygon is shaded, the polygon may be written to a frame buffer in video memory 424 for use by the display 402. As will be described in further detail below, by intelligently altering a rasterization rate, graphics rendering efficiency may be increased while still enforcing a minimum quality standard.

PMU 404 is responsible of distributing power among different components of computing system 400. Powering-up GPU 420 is part of an initialization operation to prepare GPU 420 for execution of a graphics command. In an embodiment, PMU 404 may access power management policies regarding the power consumption of CPU 401 and GPU 420. For example, a workload may be assigned to CPU 401, GPU 420, or the combination of the two. Then, considering the amount of work required by each component, PMU 404 may optimize power distribution to conserve most energy. In one example, when no workload is assigned to GPU 420 for execution or when GPU 420 is waiting idle for the next workload, PMU 404 may place GPU 420 in a sleep mode and may cause to be minimal, if any, power to be consumed by the GPU 420.

Figure 5B:
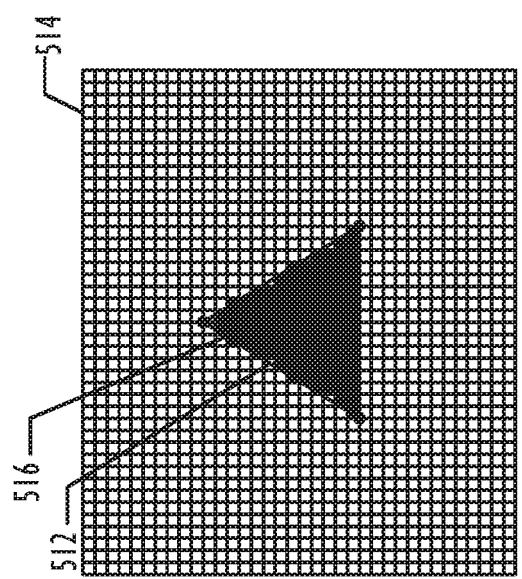
FIGS. 5A and 5B illustrate conceptual example of rasterization, in accordance with aspects of the present disclosure.
Figure 5A:
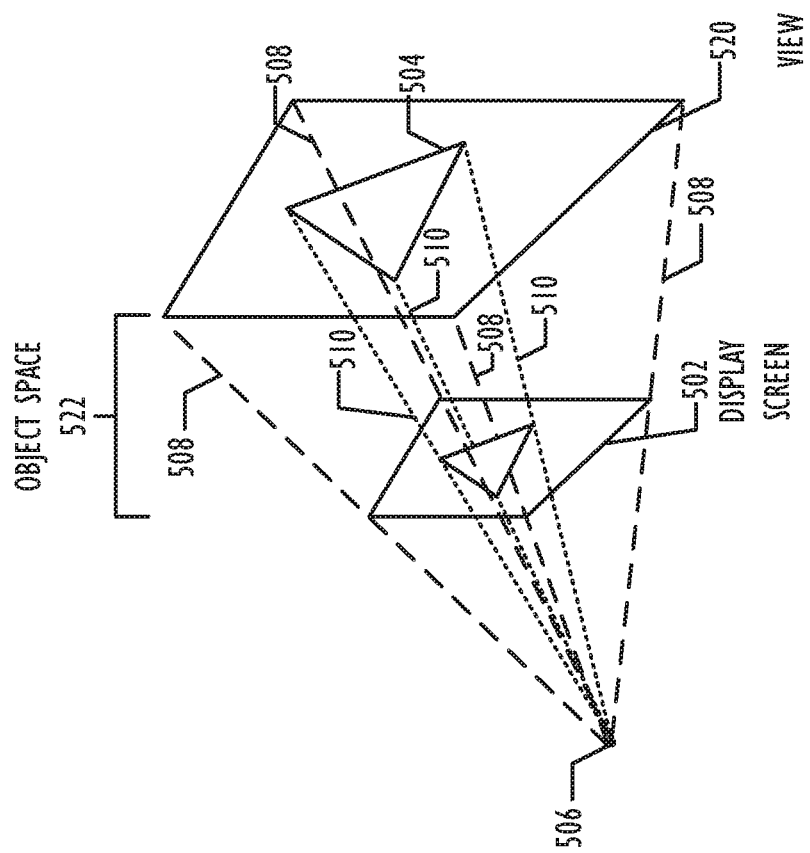

FIGS. 5A and 5B illustrate a conceptual example of rasterization, in accordance with aspects of the present disclosure. Generally, three dimensional (3D) virtual objects are built using a set of a polygons made of primitives, such as lines, points, triangles, quads, etc. The 3D virtual objects occupy an object space comprising a virtual space in memory defined by how the 3D virtual objects relate to each other and their virtual environment. Rasterization converts primitives, such as lines and triangles, into a two-dimensional image that can be displayed, for example, on a display screen 502. The display screen 502 defines screen space. Rasterization projects a view 520 of an object space 522, which may include a three-dimensional shape, such as shape 504 on the display screen 502 for a viewpoint 506. The viewpoint represents an imaginary point where the eye may be located. The display screen 502 can be thought of as a window into object space. The size and shape of the display screen 502, helps define the view into the object space. This view is bounded by a fulstrum, which is an imaginary pyramid having sides 508 going from the viewpoint 506 to the corners of the display screen 502 and into object space. Points along the boundaries of shape 504 may be sampled at a rasterization rate and projected from the object space to the display screen 502 via imaginary lines 510 that runs from the points in object space to the viewpoint 506. Where the respective imaginary lines 510 pass through the display screen 502 define the projected points 512 of the shape 504 on the display screen 502. Display grid 514 is a representation of the display screen 502 including the pixel grid. The projected points 512 define a fragment 516 and this fragment 516 may be shaded by the fragment shaders.

Generally, to provide a more immersive experience for a user, a display with a wider field of view may be used. In certain cases, large displays may be used to provide a wide field of view. One drawback of large displays is that large displays generally are not easily moved and may not be suitable, for example, in virtual-reality (VR) and/or augmented ready (AR) head-mounted displays (HMDs). HMDs typically are worn on a user's head and include displays which are worn near the user's eyes. However, a human eye has a wide field of view and a sufficiently large display to fill the field of view may be too bulky to be easily worn. Additionally, such a large display may be noticeably close by a user, potentially reducing the immersiveness of the HMD. In certain cases, a lens may be used to allow the use of smaller displays and make the HMD display feel further away from the user. However, placing a lens between a user and a display capable of filling the field of view may introduce an amount of distortion in the view of the displays.

Figure 6A:
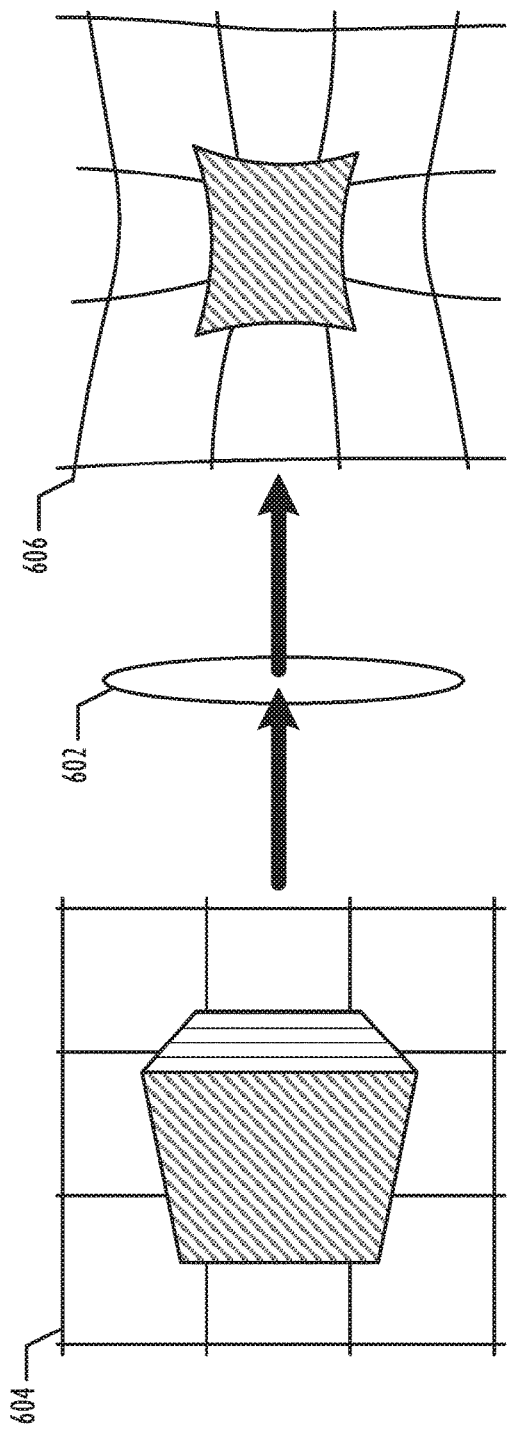
FIGS. 6A and 6B illustrates effects of a lens, in accordance with aspects of the present disclosure.
Figure 6B:
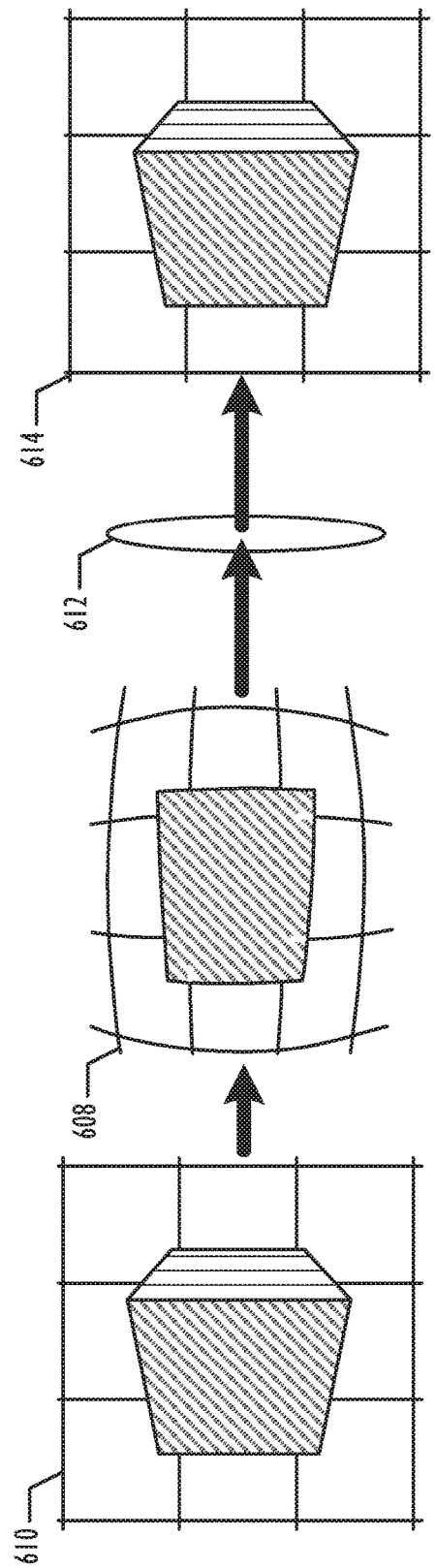

As shown in FIG. 6A, generally, placing a lens 602 between the user and the display 604 results in a pinched image 606, e.g., an image exhibiting a pincushion distortion, in the display as seen by the user. To correct for this effect, HMDs often display a barrel distorted image 608 of image 610, as shown in FIG. 6B. This barrel distorted image 608 helps correct for the pincushion distortion introduced by lens 612, thus helping the user perceive an undistorted image 614. This barrel distortion is perceived as expanding the size of a center portion of image 610 while reducing size of peripheral portions of image 610. Reducing the size of the peripheral portions reduces the effective resolution of the peripheral portions as compared to the center portion in the barrel distorted image 608.

That is, the entire display 604 has a certain fixed resolution (e.g., native or set resolution). Generally, the center portion of distorted image 608 is rendered at the fixed resolution to allow for the highest quality image to be displayed. Each pixel in the center portion of the display 604 represents a certain portion of a view into object space, and the size of each pixel of the display 604 defines the amount of the view into object space represented by the pixel. In certain cases, the fixed or set resolution of the display 604 may be sufficiently high that increasing the resolution of the display would not be perceptible to most users. In the barrel distorted image 608, the size of peripheral portions of the distorted image 608 are reduced as compared to the center portion. This distortion effectively squeezes the peripheral portions of the image into a smaller space. Conceptually, if the same level of detail (e.g., obtained by sampling from object space at the same rate) were to be maintained in these peripheral portions as the center portion, the pixels of the display 604 would have to be squeezed into the smaller space as well. That is, the resolution in the peripheral portions would have to be increased to maintain the same level of detail. However, as the display 604 has a fixed resolution, increasing the resolution in the peripheral portions cannot be performed. Rather, each pixel of the peripheral portions of the distorted image 608 represents a larger portion of the view into object space as compared to pixels in the center portions of the distorted image 608, thus reducing the effective resolution in the peripheral portions as compared to the center portion.

Reducing the effective resolution in the peripheral portions may be performed in any desired fashion. For example, in some embodiments, by sampling from the object space at a constant rate over the central portion of the display and then, in the peripheral portions, essentially throwing away some of the samples, such as by averaging or otherwise combining the values of multiple samples together, a reduced effective resolution in the peripheral portions may be achieved. According to certain aspects of the present disclosure, rather than sampling and throwing away some of the samples, the sampling rate may be dynamically adjusted in portions of the distorted image 608.

Figure 7:
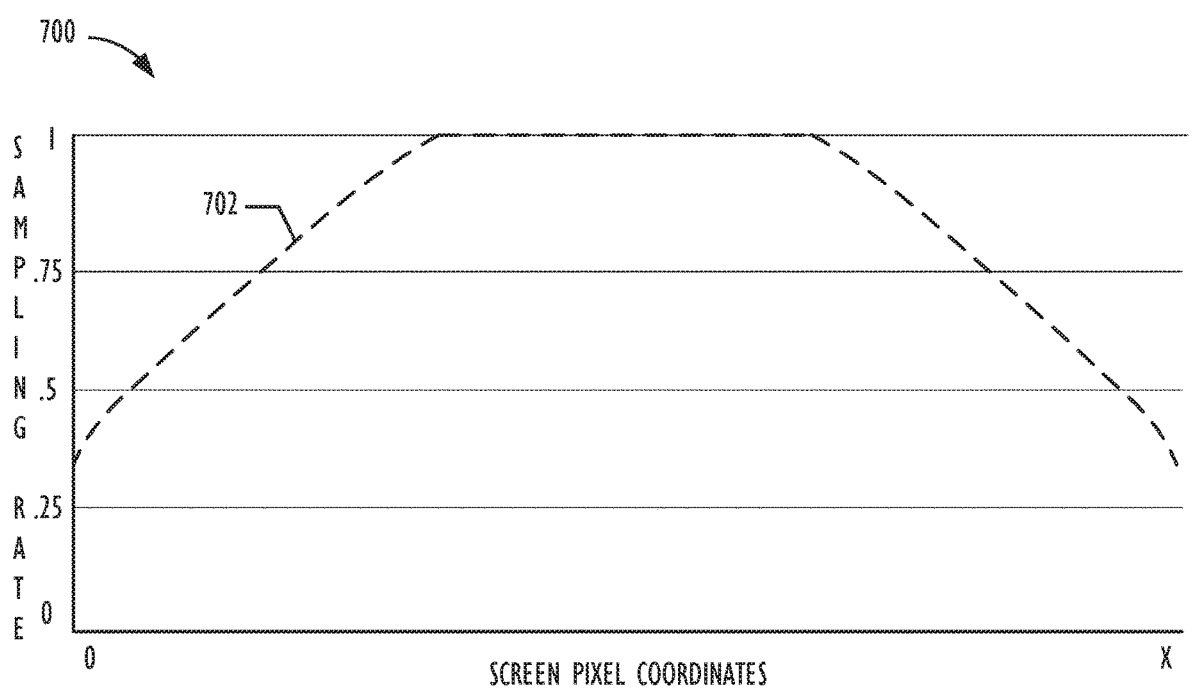
FIG. 7 is a chart illustrating an example sample rate function, in accordance with aspects of the present disclosure.

FIG. 7 illustrates an example sample rate function 700, in accordance with aspects of the present disclosure. In FIG. 7, the X-axis represents a pixel coordinate across the screen of the initial image in a single dimension. While shown as a one-dimensional figure, such as a horizontal set of pixel coordinates, it may be understood that a similar representation in another dimension, such as a vertical set of pixel coordinates, may exist in conjunction with FIG. 7. The Y-axis represents an effective sampling rate as a multiplier of the full resolution of the displayed image once a barrel distortion is applied. As shown, the maximum value on the Y-axis is 1, which represents sampling at the full, or highest, rate required by the resolution of the display or image to be displayed. In this example, after a barrel distortion is applied, the center portion of the image is sampled and rendered at the full resolution, while the peripheral portions are sampled and rendered at a lower effective resolution. The sampling rate 702 includes a center portion displayed at full resolution (x1.0), while effective resolution drops off (i.e., x0.75, x0.5, etc.) in the peripheral portions of the displayed.

It may be understood that the sampling rate 702 is based, in this case, on the pincushion distortion caused by the lens and indicates the amount of barrel distortion that may be applied to correct for the pincushion distortion. The sampling rate should be matched to the lens parameters to correspond to and correct for how the lens warps the displayed image. As the sampling rate 702 is based on the distortion of the lens, the specific curve of the sampling rate 702 may be different as between different lenses or sets of lenses. As the effective resolution drops off, rendering and applying shading to objects in the peripheral portions at the same effective resolution as applied to areas of full resolution is unnecessary as, in the case of distortion, effective resolution is reduced by the distortion effect. It should be noted that while described based on pincushion distortion caused by a lens, the sampling rate 702 may also be used to describe other resolution fall-off scenarios, such as those related to other types of distortion, shadow mapping, extended draw distances, as well as foveated imaging. For foveated imaging, the sensitivity differences between an area viewed by a fovea of a human eye and areas viewed by a perifovea and peripheral area of the human eye drops off. As eye sensitivity drops off, a lower resolution image may be displayed without a perceptual decrease in resolution or immersion. In other use cases, such as foveal imaging, areas outside of the view of the fovea offer less visual acuity than the fovea and thus the amount of graphical detail in those areas can be reduced without impacting user perceived image quality.

Generally, as the effective resolution falls-off, the rasterization rate may be reduced. Reducing the rasterization rate reduces a number of points of a 3D object for a given area, such as a tile, that are projected into display space. This reduced number of points reduces the number of fragments that need to be shaded by the fragment shaders. This reduced number of fragments and resolution also helps lower the memory footprint needed to store the shaded fragments and textures. For example, in areas where there are a reduced number of fragments, lower quality textures may be used. These lower quality textures generally are smaller than higher quality textures and have a smaller memory footprint.

Figure 8A:
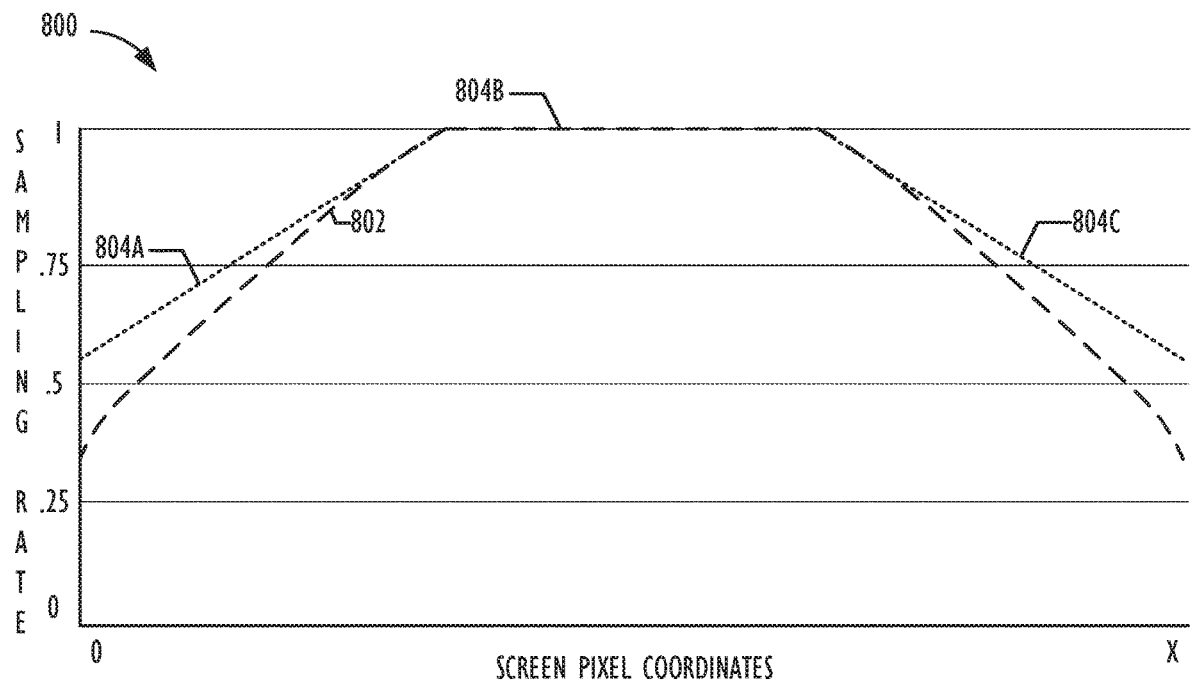
FIGS. 8A and 8B are charts illustrating functions describing a desired sampling rate for a display, in accordance with aspects of the present disclosure.
Figure 8B:
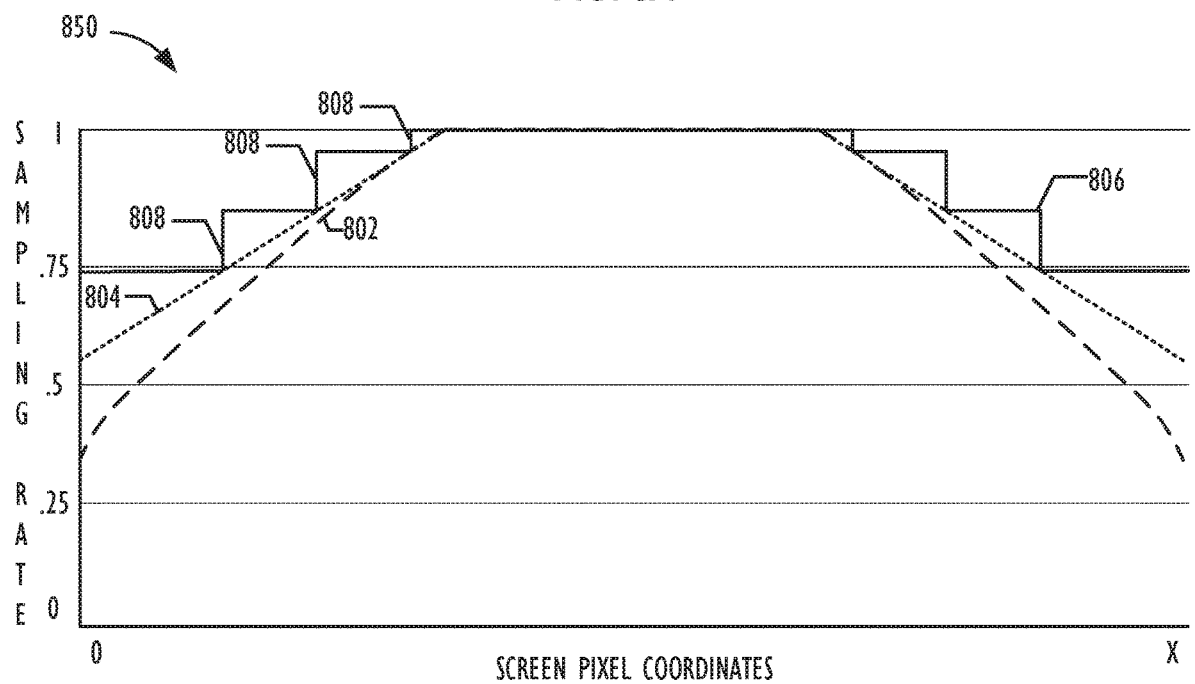

In accordance with aspects of the present disclosure, variable rasterization rates (VRR) may be used to vary rasterization rates of primitives (and therefore fragments and textures of those fragments) based on where the primitives are located. FIGS. 8A and 8B are charts 800 and 850 illustrating a function, such as a piecewise-defined linear function, describing a desired sampling rate to use across an axis of a display. This function may be used to account for a given distortion effect, e.g., a barrel distortion, in accordance with aspects of the present disclosure. Similar to FIG. 7, the X-axis in FIGS. 8A and 8B represents a pixel coordinate across the screen of the initial image in a single dimension, and the Y-axis represents an effective sampling rate, which may be expressed as a multiplier of the full resolution sampling rate of the displayed image. Desired sampling rate 802 may be characterized by one or more functions 804A-804C (collectively 804) in one dimension. For example, functions 804 may be a single function or multiple functions used to approximate the desired sampling rate 802 in the X-axis and another one or more functions (not shown) may be used to approximate the effective sampling rate for the Y-axis. In certain cases, functions 804 may be a piecewise linear function defining multiple line segments. As an example, the functions 804 can be expressed as a single piecewise linear function with three segments, a first segment 804A having a positive slope, a second segment 804B with a zero slope, and a third segment 804C having a negative slope. As a distortion effect may not be symmetrical along an axis, the slope of the first segment 804A may not be the inverse of the slope of the third segment 804C. The linear functions 804 may be used to map between a coordinate system of screen space with barrel distortion applied and a coordinate system of object space, and vice versa. While the linear functions 804, as shown, helps model resolution fall-off as experienced with barrel distortion, the linear functions 804 may also be used to model other instances where resolution changes may be used, such as for foveated imaging or other distortion effects. The linear functions 804 may be user-defined, such as by a programmer via an application programming interface (API) to resemble the desired sampling rate. In certain cases, linear functions 804 may be defined on a per-image or per-layer basis. For example, when performing stereo rendering, where an image is rendered for the right eye and another image is rendered for the left eye, separate sets of linear functions may be specified for the image rendered in the right eye and the image rendered in the left eye. In cases where the images are rendered as layers, separate linear functions may be specified for the layers.

Certain graphics processing systems may generate images for display by effectively dividing the screen space into a grid of tiles and rendering each tile separately. Generally, tiles are sized to be substantially smaller than the size of the screen in order to reduce memory and bandwidth requirements for processing each tile. Generally, these tile sizes may be set prior to displaying an image and fixed across the image. Example tile sizes include 16×16 pixel and 32×32 pixel tiles, although arbitrarily sized tiles could be used. Generally, in rendering a tile, the entire tile is rendered in a single pass, and multiple tiles may be rendered in parallel. After rendering, tiles may then be combined to form the final image for display.

In certain cases, rasterization rates 806 may be adjusted at a tile level such that the rasterization rate within a tile is constant, but may be adjusted across multiple tiles. For example, rasterization rates may be set on a per-tile basis, such that all pixels in a given tile have the same rasterization rate. Setting a single rasterization rate across a tile helps allow the tile to be efficiently processed by the graphics pipeline—while still approximating the linear functions 804. As shown, rasterization rates 806 may be determined based on the linear functions 804 such that the rasterization rates 806 approximate the linear functions. The rasterization rates 806 may be adjusted in steps 808, where the rasterization rates 806 are changed for each step 808. Each step 808 may represent one or more tiles on a particular axis, here, the x-axis. In certain cases, the highest rasterization rate (i.e., highest sampling quality) corresponding to the linear functions 804 for a tile may be used. For example, the highest rasterization rate for any point in the tile as defined by the linear functions 804 may be used as the rasterization rate for the entire tile. This ensures that the minimum quality for the tile at least matches the quality as specified by the linear functions 804.

Figure 9:
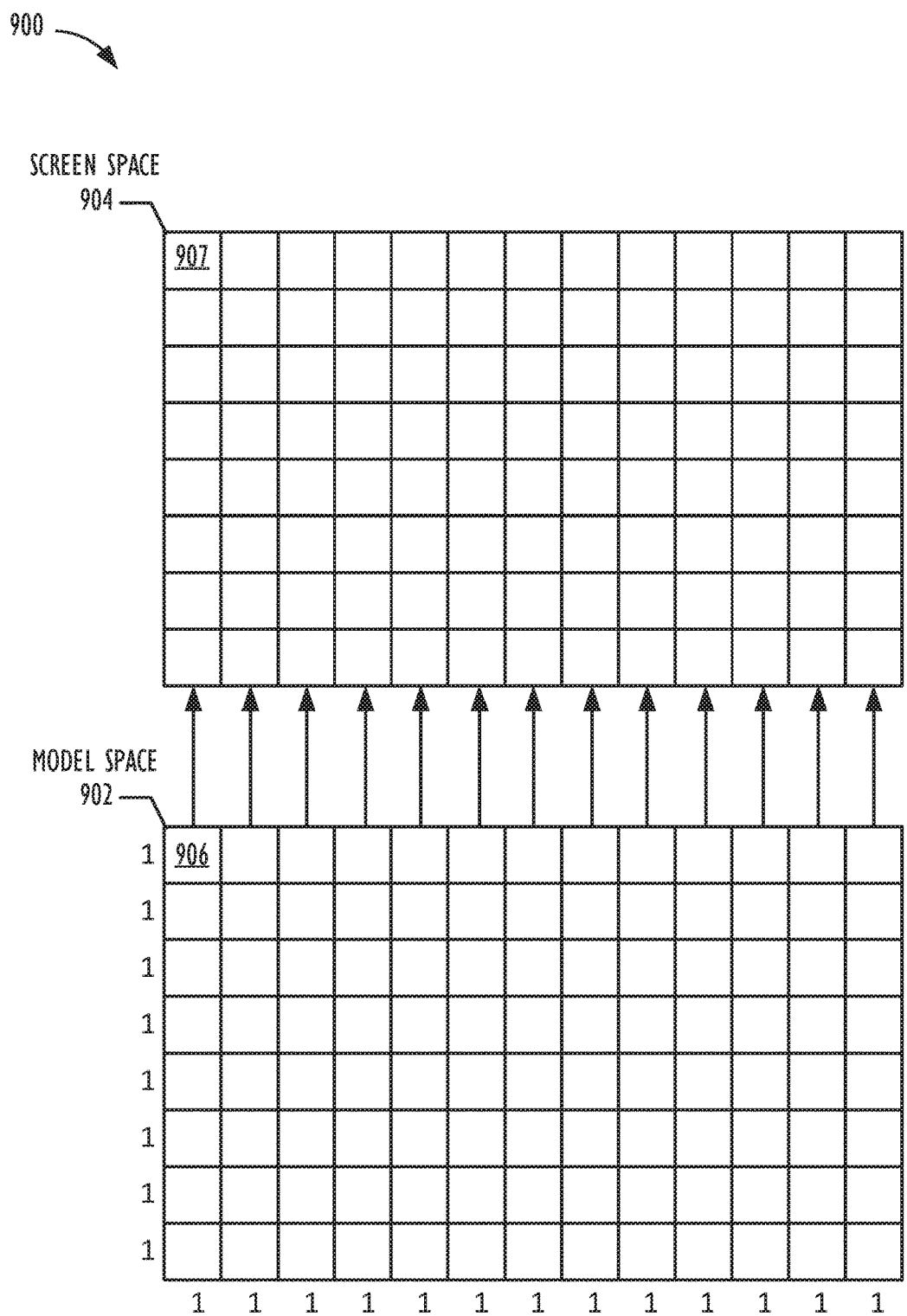
FIG. 9 illustrates an example mapping between coordinates of a view in object space and screen space, in accordance with aspects of the present disclosure.

FIG. 9 illustrates an example mapping 900 between coordinates of a view in object space 902 and screen space 904 where a uniform rasterization rate is applied, in accordance with aspects of the present disclosure. The numbers along the x-axis and y-axis, all ones ("1") in this example, represent the sampling rate for a respective row or column of tiles. In this example, there is a one-to-one mapping, on both the x-axis and the y-axis, from every pixel in a tile in model space 902 to every pixel in a respective tile in screen space 904. For example, for tile 906, given a tile size of 32×32 pixels in model space 902, rasterization would be performed at 32 points, along each axis, of models in model space 902 to draw 32 pixels, along each axis, of tile 907 in screen space 904.

Figure 10:
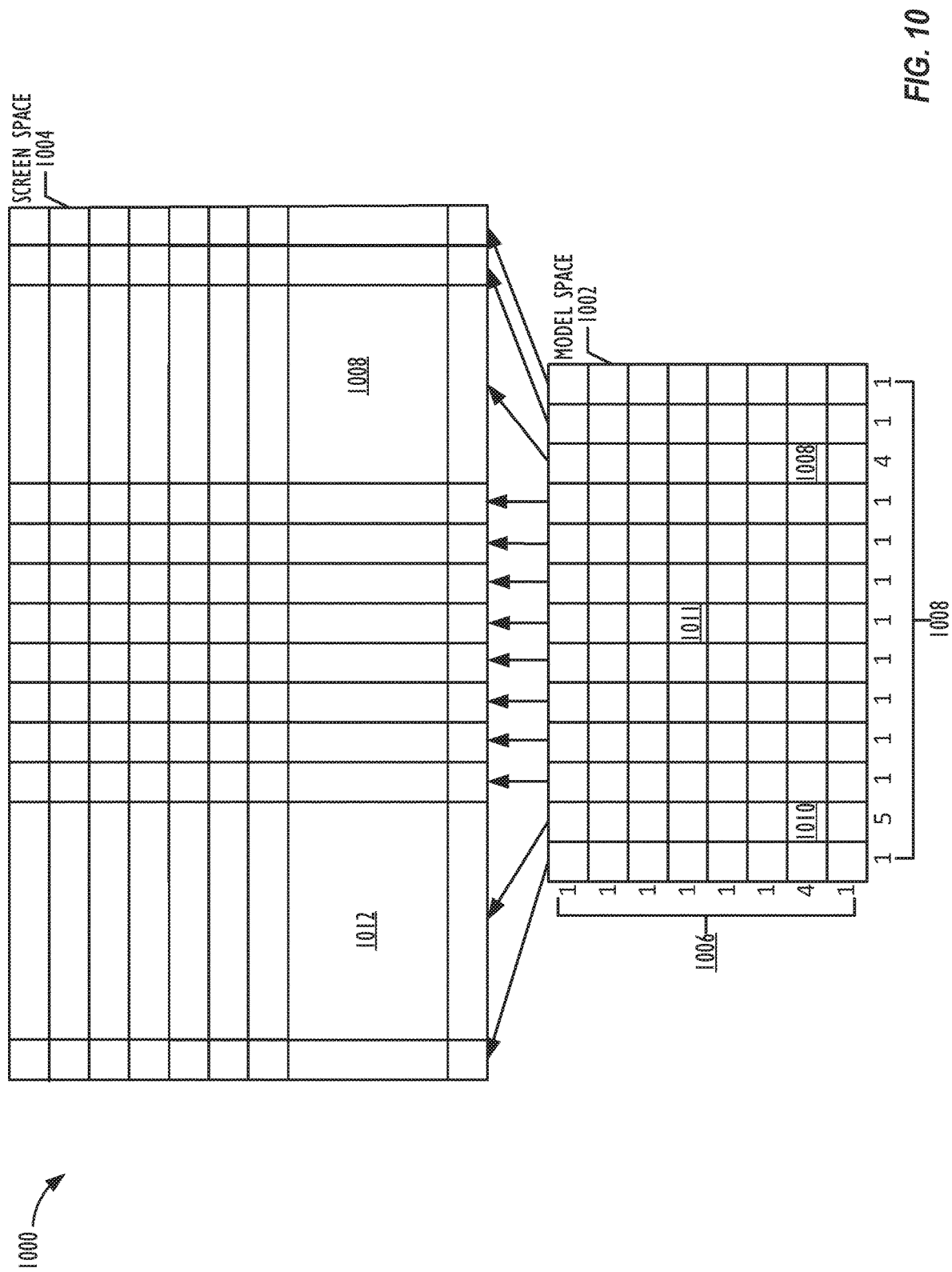
FIG. 10 illustrates an example mapping between coordinates of a view in object space and screen space, in accordance with aspects of the present disclosure.

FIG. 10 illustrates an example mapping 1000 between coordinates of a view in object space 1002 and screen space 1004 where variable rasterization rates have been applied, in accordance with aspects of the present disclosure. It should be noted that, for clarity, the example mapping 1000 illustrates varying rasterization rates for just a small subset of tiles (e.g., two tiles in the x-axial direction and one tile in the y-axial direction), rather than varying the rasterization rates all the way across the set of tiles in a given axial direction, e.g., based on a linear function (as described above with reference to FIG. 8B). As objects in object space may be rasterized into screen space at different rates on a per-tile basis, a mapping between object space and screen space may be provided, for example, via an API to a user. Numbers 1006 along the Y-axis and numbers 1008 along the X-axis of object space 1002 represent a multiplicative inverse of the rasterization rate that is applied to the tiles. For example, tile 1010 of model space 1002 has a column value of '5' along the X-axis and a row value of '4' along the Y-axis. This indicates that every point of model space in tile 1010 will be sampled at ⅕ of the rate, along the X-axis, of tile 1011 (i.e., an exemplary tile with a 'normal' or '1' rasterization rate in both the x-axial and y-axial directions). Similarly, every point of model space in tile 1010 will be sampled at ¼ of the rate, along the Y-axis, of tile 1011. That is, if tile 1011 is sampled at 32 points on the X and Y axes, then tile 1010 will be sampled at 6 points on the X-axis (e.g., sampled every 6 points as compared to the points in tile 1011), and at 8 points on the Y-axis (e.g., sampled every 8 points as compared to the points in tile 1011). Then each point is rasterized into screen space and expanded into a number of pixels correlating with the numbers 1006 along the Y-axis and numbers 1008 along the X-axis of object space 1002. For example, the 6 sampled points from tile 1010 on the X-axis may be expanded to 32 pixels on the X-axis for tile 1012 in screen space. Similarly, the 8 sampled points from tile 1010 on the Y-axis may be expanded to 32 pixels on the Y-axis for tile 1012 in screen space. Put another way, during rasterization, effectively only every fifth pixel of tile 1012 in screen space 1004 is sampled from tile 1010 in object space 1002 on the X-axis, and only every fourth pixel of tile 1012 in screen space 1004 is sampled from tile 1010 in object space 1002 on the Y-axis. In some embodiments, pixels in screen space 1004 may simply be replicated from the sampled pixels to fill tile 1012 in screen space 1004. As, for example, the barrel distortion reduces the effective resolution of tile 1012, the replicated pixels may not be perceptible. Similarly, for other implementations, such as those with foveated imaging, the tiles including replicated pixels should be located in areas where sensitivity of an eye is reduced and the replicated pixels may not be as perceptible.

Figure 11:
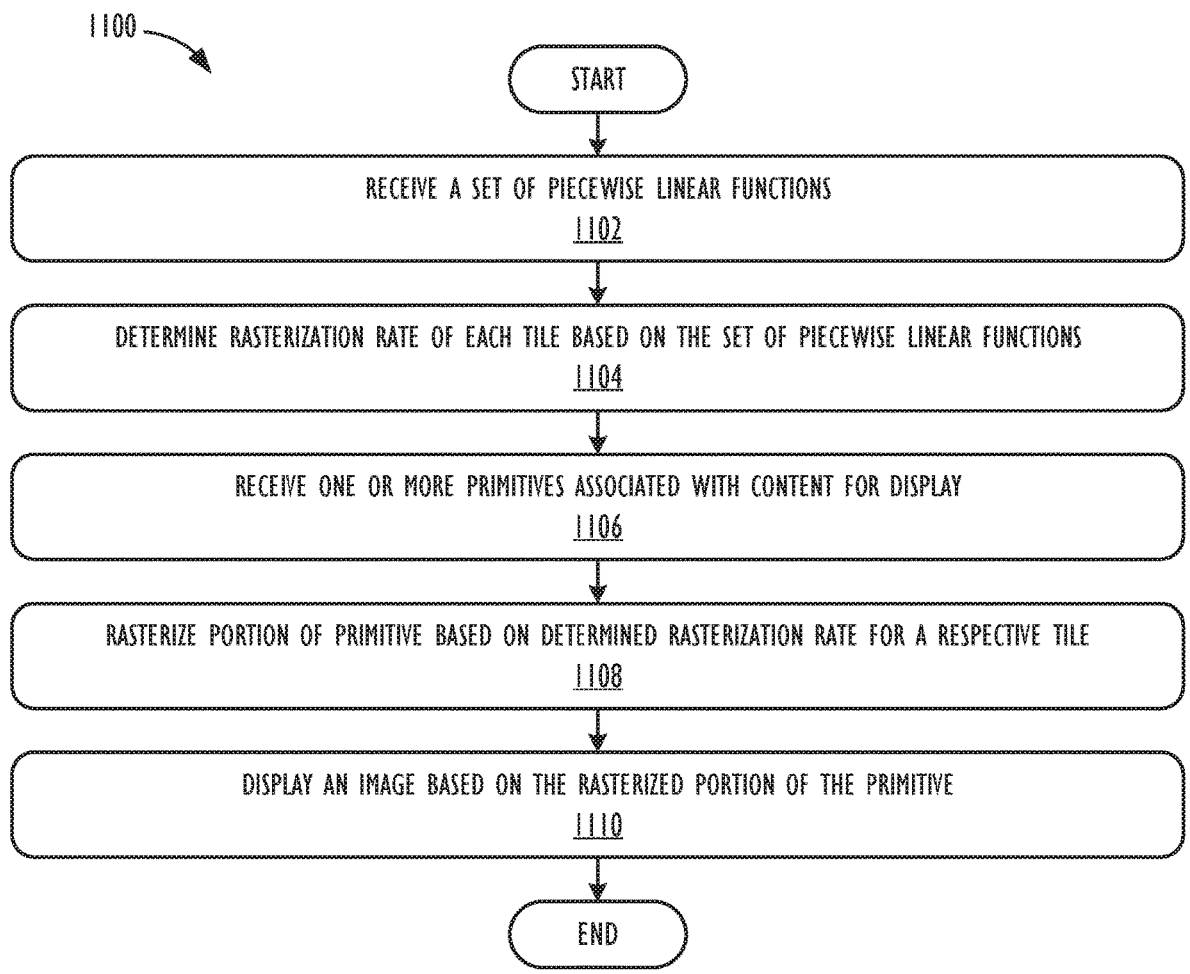
FIG. 11 is a flow diagram illustrating a technique for graphics processing, in accordance with aspects of the present disclosure.

FIG. 11 is a flow diagram illustrating a technique for graphics processing, in accordance with aspects of the present disclosure. At step 1102, the technique proceeds by receiving a first function. The first function indicates a desired sampling rate for image content and this desired sampling rate differs for locations along an axis. For example, a user, such as a programmer via an API, may provide one or more piecewise linear functions based on a lens parameter reflecting a distortion effect of a lens in one or more axial directions. At step 1104, a first rasterization rate for each tile of the plurality of tiles is determined by sampling the corresponding portion of the of piecewise linear function. For example, the piecewise linear function may be sampled at a desired degree of granularity, resulting in a set of numbers indicating a respective rasterization rate for various portions of the image (e.g., a tile or set of tiles) across a given axis. The set of numbers may thus represent the rasterization rate with various segments of the piecewise linear function for the respective portions of the image. In certain cases, the piece-wise linear function may be sampled such that the selected rasterization rate assigned to any given tile is at least as high as the highest value of the piecewise linear function corresponding to the given tile. At block 1106, one or more primitives associated with content for display are received. For example, content may include one or more virtual objects including one or more primitives. Portions of these one or more primitives are located within a tile. At block 1108, at least a portion of a primitive associated with a respective tile is rasterized based on the determined rasterization rate for the respective tile. For example, a rasterizer may determine which pixels of the display intersect the primitive at the determined rasterization rate. As a more specific example, a tile rasterized at a rate of '5' (e.g., as defined in the example discussed in conjunction with FIG. 10, above) may map every five pixels of the display to a single point in the tile. Pixels of the display may then be replicated based on the mapped pixels. At block 1110, an image based on the rasterized portion of the primitive is displayed. For example, the fragment shader may assign a color value to the rasterized pixels and/or textures may be mapped to the shaded fragment. The textures mapped may be at a reduced resolution as compared to the full resolution textures used in other portions of the image. The resulting pixels may then be output for display.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed:

1. A method of graphics processing, comprising:
receiving a first function, wherein the first function indicates a desired sampling rate for image content, wherein the first function is a piecewise linear function defining multiple line segments, wherein at least one line segment, of the multiple line segments, is defined differently as compared to another line segment of the multiple line segments, wherein the desired sampling rate differs between a first location along a first axial direction and a second location along the first axial direction, and wherein the image content is divided into a plurality of tiles;
determining a first rasterization rate for each tile of the plurality of tiles based on the desired sampling rate indicated by the first function corresponding to each respective tile, wherein a rasterization rate for tiles having multiple values for the first function across the respective tile is determined based on the highest value of the first function corresponding to the respective tile;
receiving one or more primitives associated with content for display;

rasterizing at least a first portion of a primitive of the one or more primitives associated with the respective tile based on the determined first rasterization rate for the respective tile; and displaying an image based on the rasterized first portion of the primitive.

2. The method of claim 1, wherein the first function corresponds to a lens parameter of a lens.

3. The method of claim 1, further comprising:
receiving a second function, the second function indicating a desired sampling rate for a second axial direction, the second axial direction orthogonal to the first axial direction;
determining a second rasterization rate for each tile of the plurality of tiles based on the desired sampling rate for the second axial direction indicated by the second function corresponding to each respective tile; and
rasterizing at least a second portion of the primitive associated with the respective tile based on the determined second rasterization rate for the respective tile.

4. The method of claim 3, wherein the second function comprises another piecewise linear function defining multiple line segments, wherein at least one line segment, of the multiple line segments, of the other piecewise linear function, is defined differently as compared to another line segment, of the other piecewise linear function.

5. The method of claim 4, further comprising:
providing a mapping between coordinates in a model space associated with the image content and coordinates in a screen space associated with a display;
receiving a set of coordinates; and
mapping the set of coordinates between the coordinates in the model space and the coordinates in the screen space.

6. The method of claim 1, further comprising sampling the first portion of the primitive based on the determined rasterization rate.

7. A non-transitory program storage device comprising instructions stored thereon to cause one or more graphics processors to:
receive a first function, wherein the first function indicates a desired sampling rate for image content, wherein the first function is a piecewise linear function defining multiple line segments, wherein at least one line segment, of the multiple line segments, is defined differently as compared to another line segment, wherein the desired sampling rate differs between a first location along a first axial direction and a second location along the first axial direction, and wherein the image content is divided into a plurality of tiles;
determine a first rasterization rate for each tile of the plurality of tiles based on the desired sampling rate indicated by the first function corresponding to each respective tile, wherein a rasterization rate for tiles having multiple values for the first function across the respective tile is determined based on the highest value of the first function corresponding to the respective tile;
receive one or more primitives associated with content for display;
rasterize at least a first portion of a primitive of the one or more primitives associated with the respective tile based on the determined first rasterization rate for the respective tile; and
display an image based on the rasterized first portion of the primitive.

8. The non-transitory program storage device of claim 7, wherein the first function corresponds to a lens parameter of a lens.

9. The non-transitory program storage device of claim 7, wherein the instructions stored thereon further cause one or more graphics processors to:
receive a second function, the second function indicating a desired sampling rate for a second axial direction, the second axial direction orthogonal to the first axial direction;
determine a second rasterization rate for each tile of the plurality of tiles based on the desired sampling rate for the second axial direction indicated by the second function corresponding to each respective tile; and
rasterize at least a second portion of the primitive associated with the respective tile based on the determined second rasterization rate for the respective tile.

10. The non-transitory program storage device of claim 9, wherein the second function comprises another piecewise linear function defining multiple line segments, wherein at least one line segment, of the other piecewise linear function, is defined differently as compared to another line segment, of the other piecewise linear function.

11. The non-transitory program storage device of claim 10, wherein the program storage device further comprises instructions to cause the one or more graphics processors to:
provide a mapping between coordinates in a model space associated with the image content and coordinates in a screen space associated with a display;
receive a set of coordinates; and
map the set of coordinates between the coordinates in the model space and the coordinates in the screen space.

12. The non-transitory program storage device of claim 7, wherein the program storage device further comprises instructions to cause the one or more graphics processors to sample the first portion of the primitive based on the determined rasterization rate.

13. An electronic device, comprising:
a memory;
a display;
a user interface; and
one or more graphic processors operatively coupled to the memory, wherein the one or more graphic processors are configured to execute instructions causing the one or more graphic processors to:
receive a first function, wherein the first function indicates a desired sampling rate for image content, wherein the first function is a piecewise linear function defining multiple line segments, wherein at least one line segment, of the multiple line segments, is defined differently as compared to another line segment of the multiple line segments, wherein the desired sampling rate differs between a first location along a first axial direction and a second location along the first axial direction, and wherein the image content is divided into a plurality of tiles;
determine a first rasterization rate for each tile of the plurality of tiles based on the desired sampling rate indicated by the first function corresponding to each respective tile, wherein a rasterization rate for tiles having multiple values for the first function across the respective tile is determined based on the highest value of the first function corresponding to the tile;
receive one or more primitives associated with content for display;

rasterize at least a first portion of a primitive of the one or more primitives associated with the respective tile based on the determined first rasterization rate for the respective tile; and display an image based on the rasterized first portion of the primitive.

14. The electronic device of claim 13, wherein the first function corresponds to a lens parameter of a lens.

15. The electronic device of claim 13, wherein the instructions stored thereon further cause the one or more graphics processors to:

receive a second function, the second function indicating a desired sampling rate for a second axial direction, the second axial direction orthogonal to the first axial direction;

determine a second rasterization rate for each tile of the plurality of tiles based on the desired sampling rate for the second axial direction indicated by the second function corresponding to each respective tile; and rasterize at least a second portion of the primitive associated with the respective tile based on the determined second rasterization rate for the respective tile.

16. The electronic device of claim 15, wherein and second function comprises another piecewise linear function defining multiple line segments, wherein at least one line segment, of the other piecewise linear function, is defined differently as compared to another line segment, of the other piecewise linear function.

17. The electronic device of claim 16, wherein the instructions stored thereon further cause the one or more graphic processors to:

provide a mapping between coordinates in a model space associated with the image content and coordinates in a screen space associated with a display;

receive a set of coordinates; and map the set of coordinates between the coordinates in the model space and the coordinates in the screen space.

* * * * *

UNITED STATES PATENT AND TRADEMARK OFFICE
CERTIFICATE OF CORRECTION

Page 1 of 1

PATENT NO. : 11,120,591 B2
APPLICATION NO. : 16/428374
DATED : September 14, 2021
INVENTOR(S) : Michal Valient et al.

It is certified that error appears in the above-identified patent and that said Letters Patent is hereby corrected as shown below:

In the Claims

Claim 13, at Column 16, Line 65, insert -- respective -- before "tile"

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*